United States Patent
Newman et al.

(10) Patent No.: US 10,174,650 B2
(45) Date of Patent: Jan. 8, 2019

(54) VEHICLE WITH INTEGRATED TURBOCHARGER OIL CONTROL RESTRICTION

(71) Applicant: FORD GLOBAL TECHNOLOGIES, LLC, Dearborn, MI (US)

(72) Inventors: Christopher William Newman, Farmington Hills, MI (US); Timothy Andrew Strand, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 816 days.

(21) Appl. No.: 14/549,630

(22) Filed: Nov. 21, 2014

(65) Prior Publication Data

US 2016/0146076 A1     May 26, 2016

(51) Int. Cl.
| | |
|---|---|
| F02B 33/44 | (2006.01) |
| F02B 25/06 | (2006.01) |
| F01M 13/02 | (2006.01) |
| F01M 13/04 | (2006.01) |
| F01M 13/00 | (2006.01) |
| F02M 25/06 | (2016.01) |
| F02B 37/00 | (2006.01) |

(52) U.S. Cl.
CPC ...... *F01M 13/021* (2013.01); *F01M 13/0011* (2013.01); *F01M 13/0405* (2013.01); *F02B 37/00* (2013.01); *F02M 25/06* (2013.01); *F01M 2013/027* (2013.01); *Y02T 10/121* (2013.01); *Y02T 10/144* (2013.01)

(58) Field of Classification Search
CPC ............ F01M 13/021; F01M 13/0011; F01M 13/0405; F02B 37/00; Y02T 10/121; Y02T 10/144

USPC ...................... 60/605.1, 605.3; 123/572–574
See application file for complete search history.

(56) References Cited

U.S. PATENT DOCUMENTS 1,644,719 A * 10/1927 Fliedner ................. F01M 13/02
                                                 123/572
2,065,846 A * 12/1936 Wischmeyer .......... B67D 3/047
                                                 137/206
(Continued)

FOREIGN PATENT DOCUMENTS

| CN | 101608562 A | 12/2009 |
|---|---|---|
| DE | 10249720 A1 | 5/2004 |

(Continued)

OTHER PUBLICATIONS

English machine translation of CN101608562.
(Continued)

*Primary Examiner* — Thai Ba Trieu
(74) *Attorney, Agent, or Firm* — Julia Voutyras; King & Schickli, PLLC (57) ABSTRACT

A vehicle incorporates a turbocharged internal combustion engine and a crankcase ventilation system. That crankcase ventilation system includes a first vent line connecting a cam cover at a first spigot to an air inlet duct at a second spigot. In addition the system includes a second vent line connected between the crankcase and the intake manifold of the engine. A one-way valve is provided in the second vent line. A restriction is integrated into either the first spigot, the second spigot or a quick connect that connects the first vent line to the first or second spigot.

10 Claims, 7 Drawing Sheets

(56) References Cited

U.S. PATENT DOCUMENTS

| | | | | |
|---|---|---|---|---|
| 2,177,875 A * | 10/1939 | Norza | B67D 3/048 | 137/595 |
| 3,367,311 A * | 2/1968 | Tenney | F02B 27/06 | 123/65 E |
| 3,476,138 A * | 11/1969 | Ellsworth | B67D 3/047 | 137/323 |
| 3,672,172 A * | 6/1972 | Hammond | F01M 11/08 | 123/572 |
| 3,858,565 A * | 1/1975 | Buckman | F02M 31/06 | 123/552 |
| 4,169,432 A * | 10/1979 | White | F01M 13/025 | 123/574 |
| 4,217,870 A * | 8/1980 | Schleiermacher | F01M 13/023 | 123/572 |
| 4,295,457 A * | 10/1981 | Schleiermacher | F01M 13/023 | 123/574 |
| 4,962,745 A * | 10/1990 | Ohno | F01M 11/08 | 123/572 |
| 5,456,239 A * | 10/1995 | Henderson | F01M 13/021 | 123/572 |
| 6,148,806 A * | 11/2000 | Mueller | F02M 25/0836 | 123/572 |
| 6,171,355 B1 * | 1/2001 | Gieseke | B01D 46/001 | 55/330 |
| 7,431,023 B2 * | 10/2008 | Kavanagh | F01M 13/022 | 123/572 |
| 7,523,748 B2 * | 4/2009 | Hirano | F01M 13/02 | 123/572 |
| 7,712,456 B2 * | 5/2010 | Hirano | F01M 13/021 | 123/572 |
| 7,810,848 B2 * | 10/2010 | Yoshino | F16L 37/098 | 285/305 |
| 8,240,296 B2 * | 8/2012 | Marushima | F01M 3/02 | 123/572 |
| 8,439,022 B2 * | 5/2013 | Ruppel | F01M 13/022 | 123/572 |
| 8,695,339 B2 * | 4/2014 | Spix | F01M 13/028 | 123/572 |
| 8,915,237 B2 * | 12/2014 | Copley | F01M 13/021 | 123/572 |
| 8,960,167 B2 * | 2/2015 | Hotta | F01M 13/022 | 123/572 |
| D727,970 S * | 4/2015 | Peterson | D15/5 | |
| 9,027,536 B2 * | 5/2015 | Pursifull | F01M 13/023 | 123/572 |
| 9,238,980 B2 * | 1/2016 | An | F01M 13/02 | 123/572 |
| 9,267,404 B2 * | 2/2016 | Shin | F01M 13/028 | 123/572 |
| 9,303,592 B2 * | 4/2016 | Pursifull | F02M 25/06 | |
| 9,347,368 B2 * | 5/2016 | Ulrey | F01M 13/022 | 123/574 |
| 9,359,923 B2 * | 6/2016 | Pursifull | F01M 13/022 | 123/572 |
| 9,512,754 B2 * | 12/2016 | Fujikawa | F01M 13/022 | 123/572 |
| 9,909,470 B2 * | 3/2018 | Christian | F01M 13/022 | |
| 2001/0022175 A1 * | 9/2001 | Moren | F01M 13/022 | 123/572 |
| 2001/0047801 A1 * | 12/2001 | Baeuerle | F01M 13/023 | 123/574 |
| 2005/0000496 A1 * | 1/2005 | Norrick | F02M 25/06 | 123/572 |
| 2006/0243258 A1 * | 11/2006 | Withrow | F01M 13/022 | 123/573 |
| 2009/0090337 A1 * | 4/2009 | Asanuma | F01M 13/022 | 123/574 |
| 2009/0308364 A1 * | 12/2009 | Konohara | F01M 13/022 | 123/572 |
| 2010/0000499 A1 * | 1/2010 | Braun | F01M 13/022 | 123/574 |
| 2011/0073082 A1 * | 3/2011 | Hattori | F01M 13/021 | 123/574 |
| 2011/0197864 A1 * | 8/2011 | Karcher | F02M 25/089 | 123/574 |
| 2013/0213369 A1 * | 8/2013 | Doko | F01M 13/023 | 123/574 |
| 2014/0207360 A1 * | 7/2014 | Monros | F01M 13/023 | 701/113 |
| 2014/0209074 A1 * | 7/2014 | Kahle | F16L 37/088 | 123/572 |
| 2014/0224232 A1 * | 8/2014 | Hotta | F01M 13/0011 | 123/574 |
| 2015/0020783 A1 * | 1/2015 | Sadamitsu | F01M 13/022 | 123/568.12 |
| 2015/0159596 A1 * | 6/2015 | Wakiya | F01M 13/00 | 123/41.86 |
| 2015/0247432 A1 * | 9/2015 | Fujikawa | F01M 13/023 | 123/573 |
| 2016/0115911 A1 * | 4/2016 | Newman | F01M 13/02 | 123/568.11 |
| 2016/0138442 A1 * | 5/2016 | An | F01M 13/021 | 123/559.1 |
| 2016/0312686 A1 * | 10/2016 | Christian | F01M 13/0011 | |

FOREIGN PATENT DOCUMENTS

| | | | | |
|---|---|---|---|---|
| DE | 102005020442 A1 | 11/2006 | | |
| JP | 64024106 A * | 1/1989 | | F02M 13/00 |
| JP | WO 2013073010 A1 * | 5/2013 | | F01M 13/021 |
| WO | 97/29278 A1 | 8/1997 | | |
| WO | 2009/009902 A1 | 1/2009 | | |

OTHER PUBLICATIONS

English machine translation of DE10249720.
English machine translation of DE102005020442.
U.S. Appl. No. 14/525,554, filed Oct. 28, 2014 entitled Crankcase Ventilation for Turbocharged Engine.

* cited by examiner

VEHICLE WITH INTEGRATED TURBOCHARGER OIL CONTROL RESTRICTION

TECHNICAL FIELD

This document relates generally to the motor vehicle field and, more particularly, to a vehicle incorporating integrated turbocharger oil control restriction and a new and improved ventilation system for a crankcase of a turbocharged internal combustion engine.

BACKGROUND

Gases accumulate in an engine crankcase when gases from engine cylinders bypass engine pistons and enter the crankcase during engine rotation. These gases are commonly referred to as blowby gases. The blowby gases can be combusted within engine cylinders to reduce engine hydrocarbon emissions using a positive crankcase ventilation (PCV) system which returns the blowby gases to the engine air intake and combusts the gases with a fresh air-fuel mixture. Combusting crankcase gases via the engine cylinders may require a motive force to move the crankcase gases from the engine crankcase to the engine air intake. One conventional way to provide motive force to move crankcase gases into the engine cylinders is to provide a conduit between the crankcase and a low pressure region (e.g., vacuum) of the engine intake manifold downstream of an engine throttle body. In addition, fresh air from a point upstream of the throttle body is added to the crankcase via a separate conduit (i.e., breather) to help flush the blowby products from the crankcase and into the intake manifold.

Use of turbocharging with combustion engines is becoming increasingly prevalent. In an exhaust-gas turbocharger, for example, a compressor and a turbine are arranged on the same shaft (called a charger shaft) wherein a hot exhaust-gas flow supplied to the turbine expands within the turbine to release energy and cause the charger shaft to rotate. The charger shaft drives a compressor which is likewise arranged on the charger shaft. The compressor is connected in an air inlet duct between an air induction and filtering system and the engine intake manifold so that when the turbocharger is activated, the charge air supplied to the intake manifold and engine cylinders is compressed.

Turbocharging increases the power of the internal combustion engine because a greater air mass is supplied to each cylinder. The fuel mass and the mean effective pressure are increased, thus improving volumetric power output. Accordingly, the engine displacement used for any particular vehicle can be downsized in order to operate with increased efficiency and reduced fuel use. The turbocharger is inactive during times of low power requirements and is activated during times of high load, such as wide open throttle (WOT). In addition to reduced fuel consumption, turbocharging has a beneficial effect of reducing emissions of carbon dioxide and pollutants.

Due to the increased pressure at the intake manifold during high load operation which results from compressing the inlet air by the turbocharger compressor, modifications to the conventional crankcase ventilation system are necessary. In particular, the high pressure introduced downstream of the compressor (e.g., in the intake manifold) could reverse the flow in the vent line thereby pressurizing the crankcase to an extent that could cause failure of the seals. To prevent such a reversal, a check valve is usually placed in that vent line. To avoid a buildup of blowby gas in the crankcase, the flow is allowed to reverse in the other vent line (i.e., the breather that otherwise supplies fresh air from a point upstream of the throttle body and turbocharger compressor into the crankcase). Thus, any pressure buildup in the crankcase that could damage the seals is prevented.

During engine idling when a large vacuum is present at the intake manifold, it is desirable to maintain a negative pressure in the crankcase so that blowby gases are readily captured and removed. To ensure a negative crankcase pressure at idle on a boosted gas (i.e., turbocharged) engine, it is often necessary to restrict the fresh air feed to the crankcase. A restriction, being in a form of a short connect in corresponding to a breather vent line has been used to accomplish this reducing the fresh air feed. Such configuration of the restriction is to allow sufficient airflow and release of pressure from the crankcase during boosted engine operation while also reducing air intake during idle when it is desired to maintain a negative crankcase pressure.

SUMMARY

In accordance with the purposes and benefits described herein, a vehicle is provided comprising an internal combustion engine, a turbocharger compressor, a first vent line, a second vent line, a one-way valve and a restriction. The internal combustion engine includes an inlet duct, an intake manifold, a cam cover and a crankcase. The turbocharger compressor has an inlet connected to the air inlet duct and an outlet connected to the intake manifold.

The first vent line is connected to the cam cover at a first spigot and the air inlet duct at a second spigot. The second vent line is connected between the crankcase and the intake manifold. The one-way valve in communication with the second vent line allows air to flow toward the intake manifold from the crankcase. At the same time the restriction limits airflow through the first vent line during operation of the engine. The restriction is integrated into one of the first spigot, the second spigot and a quick connect that connects the first vent line to one of the first spigot and the second spigot.

The vehicle further includes a first oil separator in the cam cover adjacent the first spigot. Further, a second oil separator is provided in the crankcase adjacent the connection to the second vent line. In one possible embodiment, the one-way valve in that second vent line is a check valve. In one possible embodiment, the restriction is integrated into the first spigot. In one possible embodiment, the restriction is integrated into the second spigot. In one possible embodiment, the restriction is integrated into the quick connect that connects the first vent line to the first spigot. In yet another possible embodiment, the restriction is integrated into the quick connect that connects the first vent line to the second spigot.

In accordance with an additional aspect, a ventilation system is provided for a crankcase of a turbocharged internal combustion engine. That ventilation system comprises a first vent line connecting a cam cover and an air intake duct of the engine, a second vent line connecting a crankcase and an intake manifold to the engine, a one-way valve in communication with the second vent line allowing air to flow toward the intake manifold from the crankcase and a restriction limiting airflow through the first vent line during operation of the engine. The restriction is integrated into one of the first spigot, the second spigot, and a quick connect that connects the first vent line to one of the first spigot and the second spigot.

In accordance with yet another aspect, a method of ventilating a crankcase of a turbocharged internal combustion engine is provided. That method comprises the steps of: (a) connecting a cam cover and an air intake duct of the engine with a first vent line, (b) connecting the crankcase and an air intake manifold of the engine with a second vent line, (c) providing a one-way valve in the second vent line and (d) integrating a restriction into one of a first spigot in the cam cover, a second spigot in the air intake duct and a quick connect of the first vent line for connecting the first vent line to one of the first or second spigots.

In the following description, there are shown and described several preferred embodiments of the vehicle and ventilation system. As it should be realized, the vehicle and ventilation system are capable of other, different embodiments and their several details are capable of modification in various, obvious aspects all without departing from the vehicle and system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle crankcase ventilation system and together with the description serve to explain certain principles thereof. In the drawing figures.

Reference will now be made in detail to the present preferred embodiments of the vehicle and crankcase ventilation system, examples of which are illustrated in the accompanying drawing figures.

DETAILED DESCRIPTION

Figure 1:
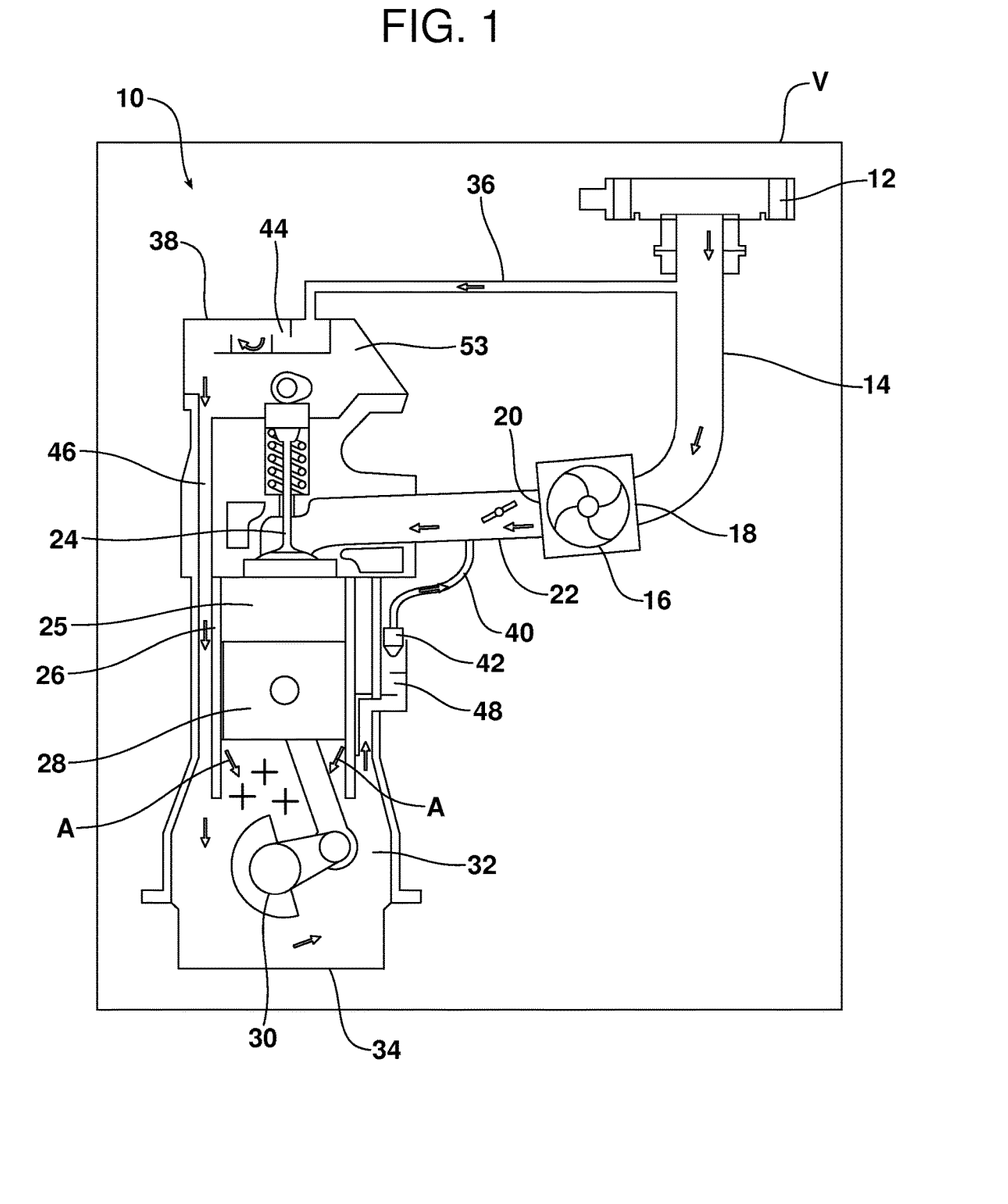
FIG. 1 is a schematic illustration of a turbocharged internal combustion engine illustrating airflow through the engine during non-boosted operation.

Reference is now made to FIG. 1 illustrating a vehicle V including a turbocharged internal combustion engine 10. As illustrated, the engine 10 includes an air filter 12 connected to an air inlet duct 14. A turbocharger compressor 16 includes an inlet 18 connected to the air inlet duct 14 and an outlet 20 connected to an intake manifold 22. During operation of the engine 10, combustion air is drawn through the air filter 12 and the air inlet duct 14, turbocharger compressor 16 and intake manifold 22 past the intake valve 24 into combustion chamber 25 within the piston cylinder 26 where that air is mixed with fuel, compressed by the piston 28 and combusted by means of a spark from a spark plug (not shown). That combustion drives the piston 28 in the cylinder 26 turning the cam shaft 30.

During engine operation, blowby gases escape between the piston 28 and the piston cylinder 26 (note action arrows A). These gases accumulate in the engine crankcase 32 above the oil pan 34. The illustrated engine 10 is equipped with a positive crankcase ventilation system to return the blowby gases to the air intake and, more particularly, the intake manifold 22, and then combust those gases with a fresh air-fuel mixture in the combustion chamber 25 in order to reduce engine hydrocarbon emissions.

The positive crankcase ventilation system includes a breather or first vent line 36 which connects the air inlet duct 14 and the cam cover 38. A second vent line 40 connects the crankcase 32 with the intake manifold 22. A one-way check valve 42 is provided in communication with the second vent line 40 such as adjacent the connection point with the crankcase 32. As will be described in greater detail below, a restriction 50 is provided to limit airflow through the first vent line 36 during operation of the engine.

As illustrated by the action arrows in FIG. 1, during non-boosted operation of the engine such as during engine idle, the positive crankcase ventilation system functions to draw air from the air inlet duct 14 through the first vent line 36, the oil separator 44 in the cam cover 38 and the conduit 46 into the crankcase 32. This intake air functions to sweep the blowby gases from the crankcase 32 through the oil separator 48 past the one-way valve 42 and then through the second vent line 40 to the intake manifold 22. The blowby gases are then entrained in the intake air that has passed through the air filter 12, the air inlet duct 14 and the turbocharger compressor 16 and swept toward and past the intake valve 24 into the combustion chamber 25 in the piston cylinder 26 where the blowby gases are combusted to reduce engine hydrocarbon emissions.

Figure 2:
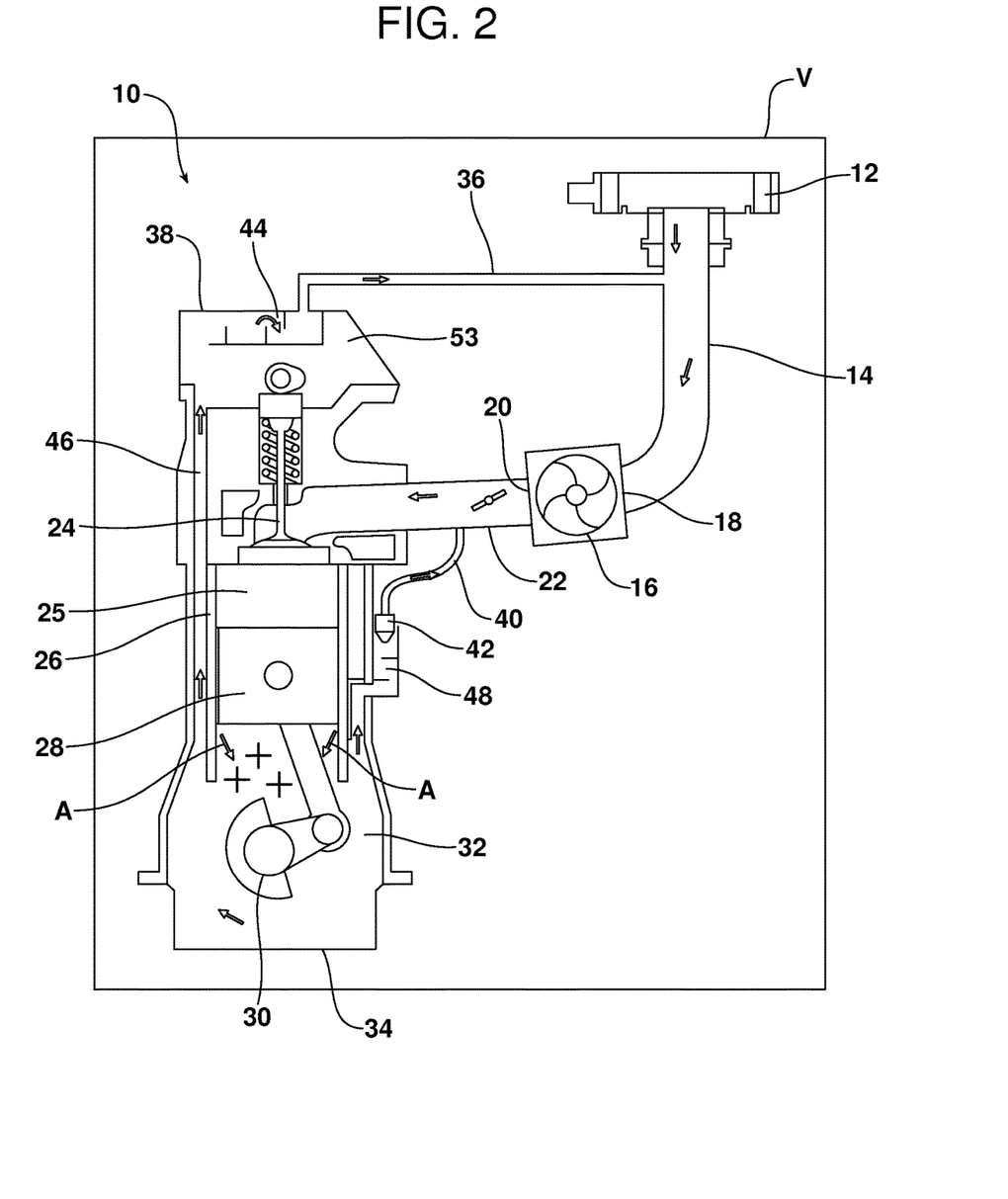
FIG. 2 is a schematic view similar to FIG. 1 but illustrating airflow through the engine during boosted operation.

As illustrated by the action arrows in FIG. 2, during turbocharger boosted operation of the engine, combustion products exiting the exhaust manifold of the engine turn a turbine (not shown) which is coupled to and drives the turbocharger compressor 16. The faster the compressor 16 is turned, the greater the increase in the density of air delivered to the combustion chamber within the piston cylinder 26. This increases the pressure of the blowby gases thereby increasing the pressure in the crankcase 32. That increase in pressure in the crankcase 32 may become sufficient to reverse flow in the conduit 46 and first vent line 36 so that internal crankcase pressure is released by air flowing through the conduit 46, past the oil separator 44 and through the first vent line 36 to the air intake duct 14. As should be appreciated, in either non-boosted or boosted modes of operation, the blowby gases in the crankcase are returned to the combustion chamber 25 within the piston cylinders 26 and combusted with a fresh air and fuel charge to minimize exhaust engine hydrocarbon emissions.

The positive crankcase ventilation system includes a restriction 50 that is carefully sized to allow the release of blowby gas pressure from the crankcase 32 during boosted engine operation while also restricting air intake during non-boosted and idle engine operation so as to maintain a negative pressure in the crankcase at that time.

Figure 3:
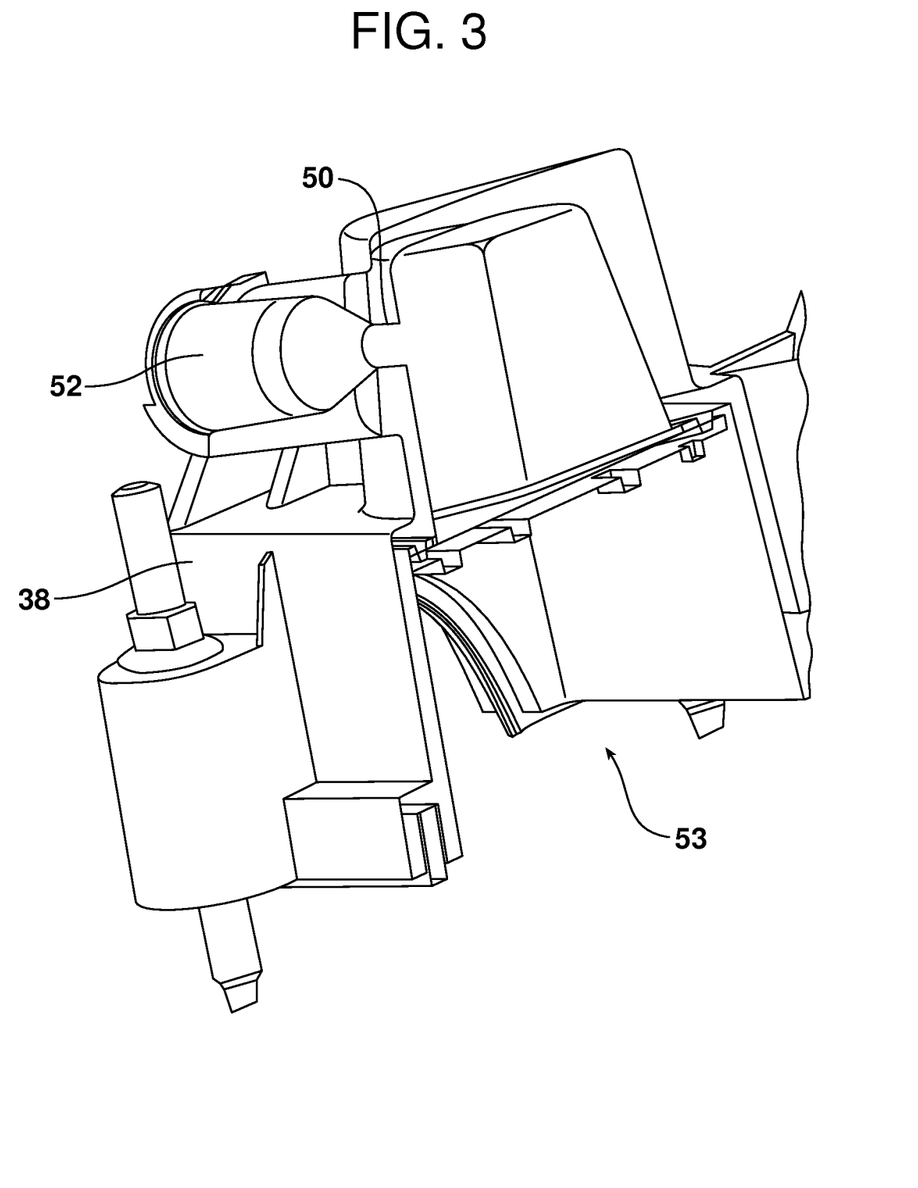
FIG. 3 is a cross-sectional view of the cam cover illustrating a restriction for limiting airflow through the first or breather vent line during operation of the engine wherein that restriction is integrated into the spigot of the cam cover which connects the first or breather vent line to the cam cover.
Figure 4A:
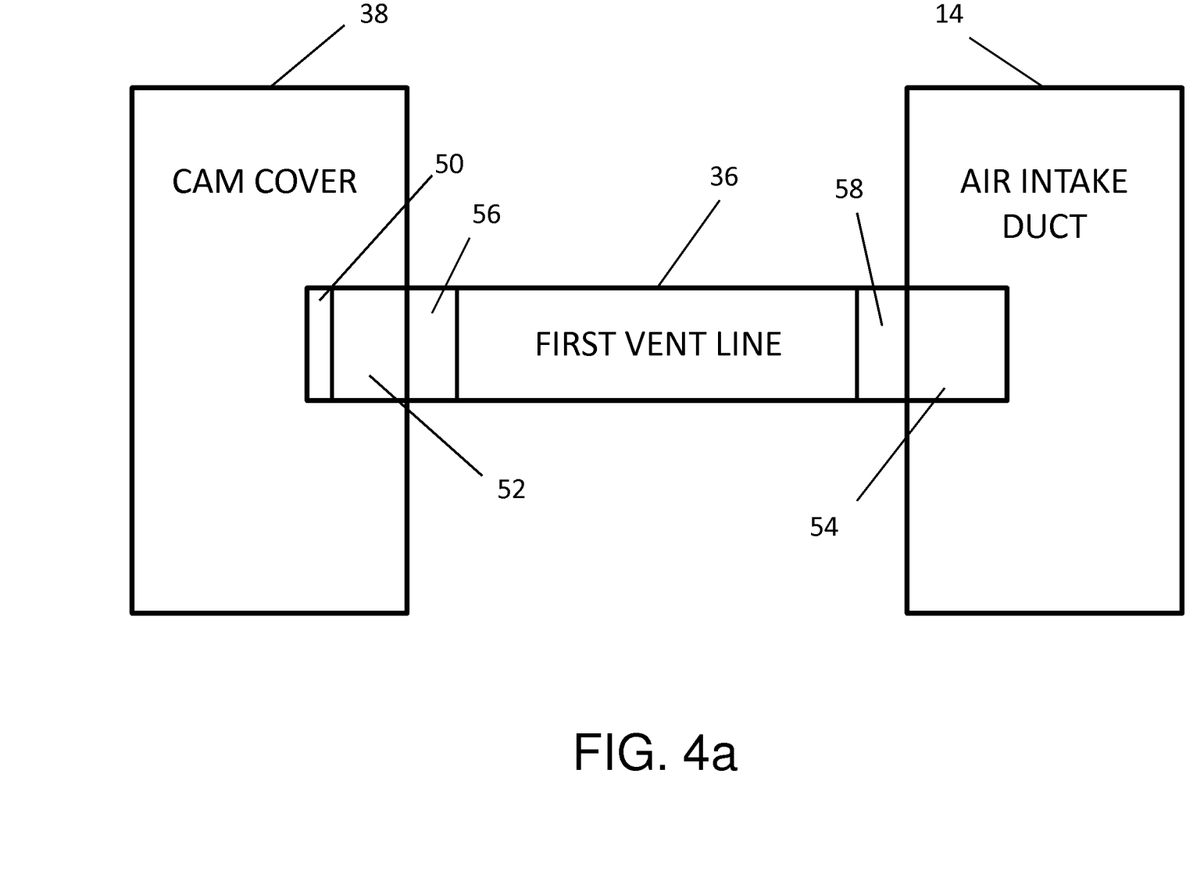
FIGS. 4a-4d are schematic block diagrams illustrating four possible embodiments of the present ventilation system wherein the restriction is integrated into either the cam cover spigot, the air intake duct spigot, a quick connect between the first or breather vent line and the cam cover spigot and a quick connect between the first or breather vent line and the air intake duct spigot.

Reference is now made to FIG. 3 illustrating one possible embodiment wherein the restriction 50 is integrated into the first spigot 52 formed in the cam cover 38 at the point where the first vent line 36 is connected to the cam cover (see also FIG. 4a). This first spigot 52 communicates with the cam compartment 53 inside the cam cover 38.

Figure 4B:
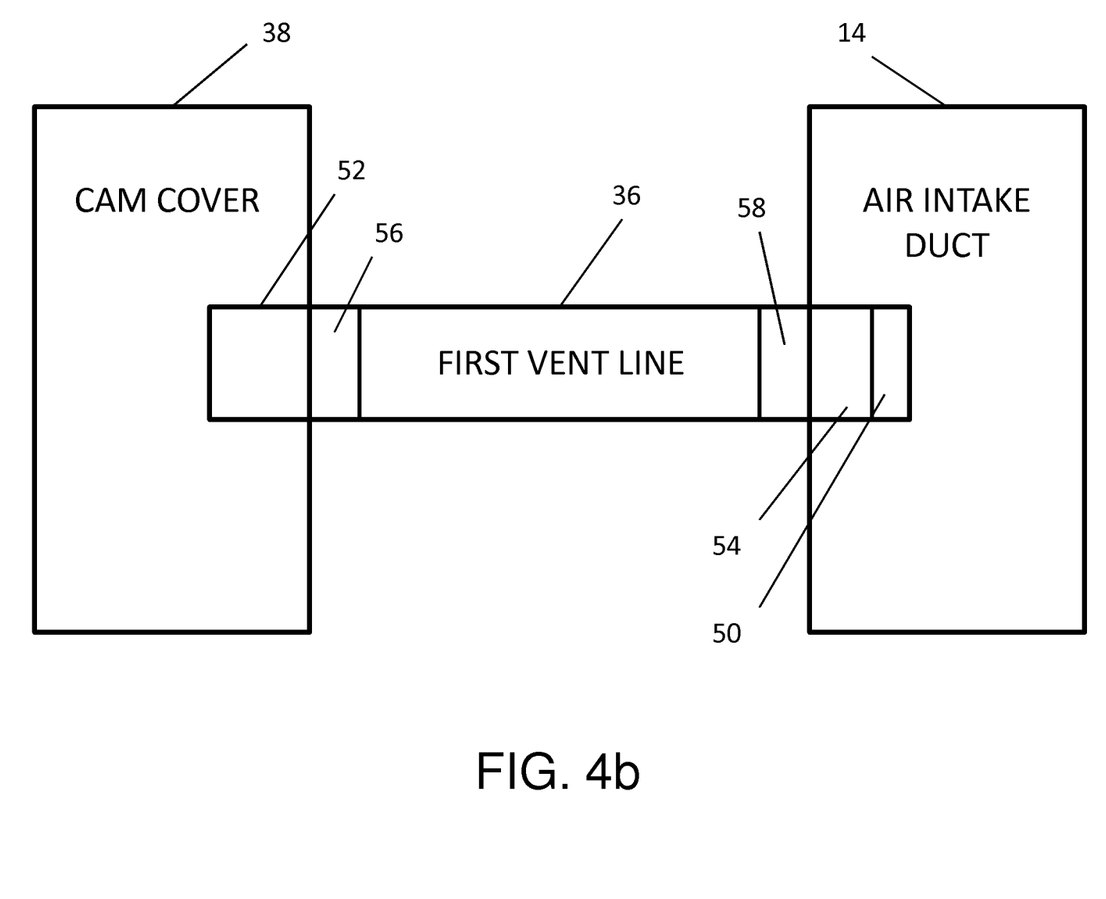

In an alternative embodiment illustrated in FIG. 4b, the restriction 50 is integrated into the second spigot 54 in the air intake duct 14 where the first vent line 36 is connected to the air intake duct.

Figure 4C:
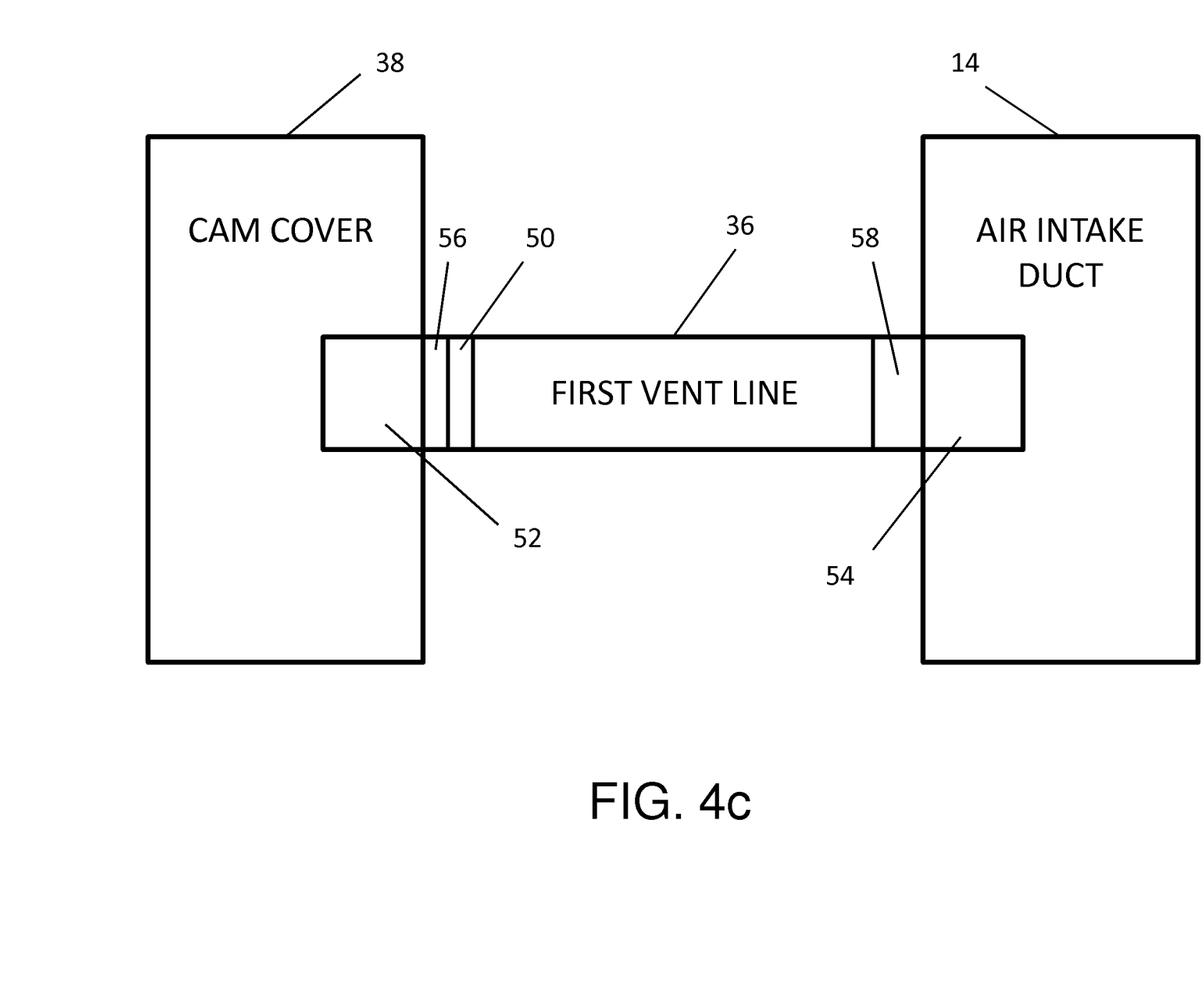

In yet another embodiment illustrated in FIG. 4c, the restriction 50 is in a form of a short connect 56 that connects the first vent line 36 to the cam cover 38 to reduce the air flow.

Figure 4D:
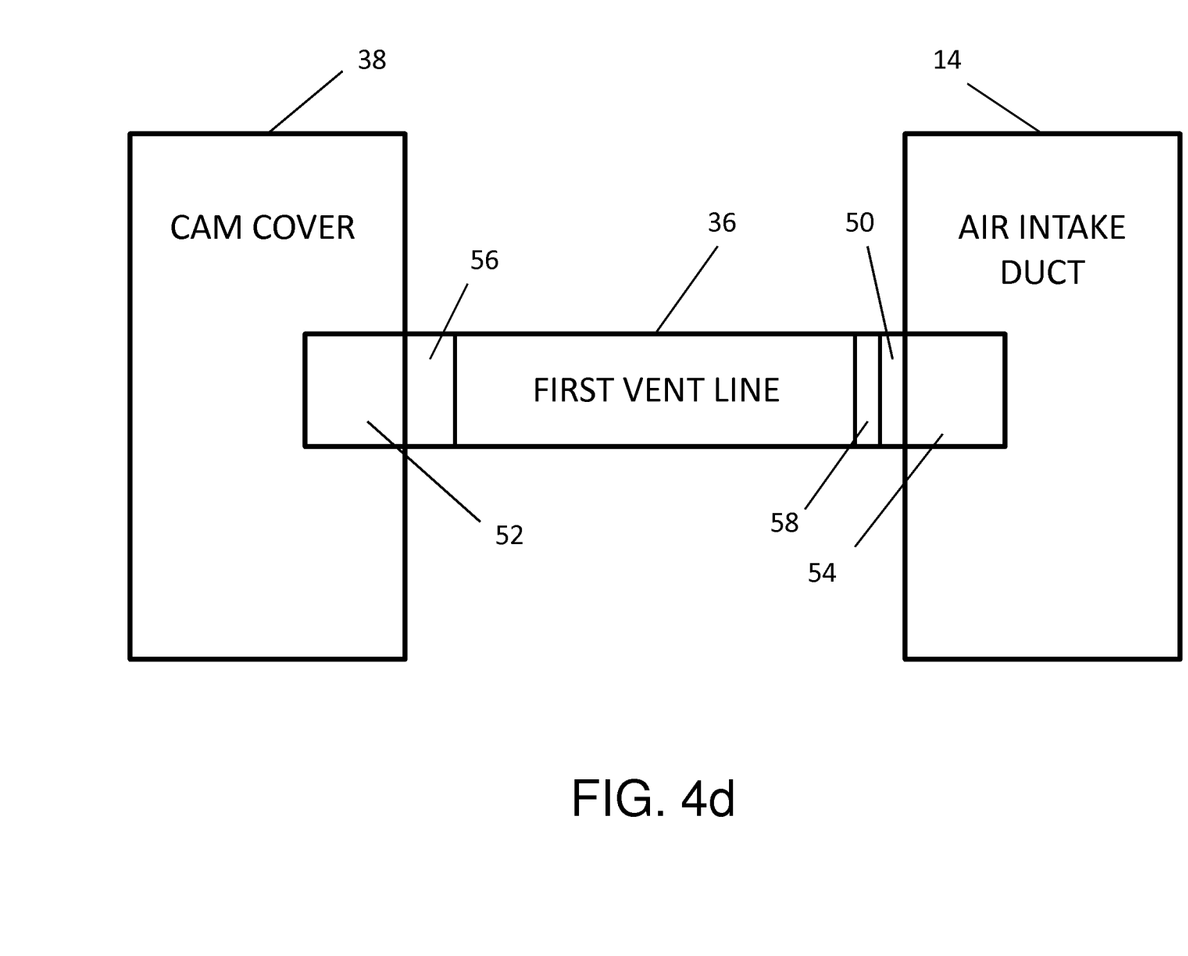

In yet another embodiment illustrated in FIG. 4d, the restriction 50 is in a form of a short connect 58 that connects the first vent line 36 to the second spigot 54 of the air inlet duct 14 to reduce the air flow.

The integration of the restriction 50 into the first spigot 52, second spigot 54, in a form of a short connect 56 or in a form of a short connect 58 is a far more cost effective solution than providing a separate restriction in the actual vent line 36. Still further, a restriction 50 that is integrated into the cam cover spigot 52 is closer to the hot engine and engine oil in the oil separator 44. The associated heat will help eliminate any potential for the restriction 50 to freeze up in inclement winter weather conditions.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A ventilation system for a crankcase of a turbocharged internal combustion engine, comprising:
    a first vent line connecting a cam cover at a first spigot to an air intake duct of the engine at a second spigot;
    a second vent line connecting a crankcase and an intake manifold of said engine;
    a one-way valve in communication with said second vent line allowing air to flow toward said intake manifold from said crankcase; and
    a restriction being a short connect integrated into an end of one of said first spigot and said second spigot and connecting said first vent line to one of said cam cover at said first spigot and said air intake duct at said second spigot at another end to reduce air flow through said first vent line during operation of said engine, wherein the restriction has a first diameter and each of said first and second spigots have a second diameter, and wherein the first diameter is smaller than the second diameter.

2. The ventilation system of claim 1, wherein said restriction is integrated into said first spigot.

3. The ventilation system of claim 1, wherein said restriction is integrated into said second spigot.

4. A method of ventilating a crankcase of a turbocharged internal combustion engine including a restriction which is a short connect having a diameter being smaller than a diameter of each of a first spigot and a second spigot, comprising:
    connecting said first spigot at a cam cover to said second spigot at an air intake duct of the turbocharged internal combustion engine with a first vent line;
    connecting the crankcase to an air intake manifold of said turbocharged internal combustion engine with a second vent line;
    providing a one-way valve in said second vent line;
    integrating the restriction into an end of said each of said first spigot and said second spigot; and
    reducing air flow through said first vent line during operation of said turbocharged internal combustion engine via said restriction connecting said first vent line to each of said cam cover at said first spigot and said air intake duct at said second spigot at another end.

5. A vehicle, comprising:
    an internal combustion engine including an air inlet duct, an intake manifold, a cam cover and a crankcase;
    a turbocharger compressor having an inlet connected to said air inlet duct and an outlet connected to said intake manifold;
    a first vent line connected to said cam cover at a first spigot and said air inlet duct at a second spigot;
    a second vent line connected between said crankcase and said intake manifold;
    a one-way valve in communication with said second vent line allowing air to flow toward said intake manifold from said crankcase; and
    a restriction being a short connect integrated into an end of one of said first spigot and said second spigot and connecting said first vent line to one of said cam cover at said first spigot and said air inlet duct at said second spigot at another end to reduce air flow through said first vent line during operation of said engine, wherein the restriction has a first diameter and each of said first and second spigots have a second diameter, and wherein the first diameter is smaller than the second diameter.

6. The vehicle of claim 5, further including a first oil separator in said cam cover.

7. The vehicle of claim 6, further including a second oil separator in said crankcase.

8. The vehicle of claim 7, wherein said one-way valve is a check valve.

9. The vehicle of claim 5, wherein said restriction is integrated into said first spigot.

10. The vehicle of claim 5, wherein said restriction is integrated into said second spigot.

* * * * *